United States Patent
Okada et al.

(10) Patent No.: US 7,589,895 B2
(45) Date of Patent: Sep. 15, 2009

(54) POLARIZING ELEMENT AND OPTICAL SYSTEM INCLUDING POLARIZING ELEMENT

(75) Inventors: Makoto Okada, Osaka (JP); Kayoko Fujimura, Osaka (JP)

(73) Assignees: Nalux Co., Ltd., Osaka (JP); Japan Science and Technology Agency, Saitama (JP)

( * ) Notice: Subject to any disclaimer, the term of this patent is extended or adjusted under 35 U.S.C. 154(b) by 283 days.

(21) Appl. No.: 10/574,833

(22) PCT Filed: Oct. 5, 2004

(86) PCT No.: PCT/JP2004/014991

§ 371 (c)(1),
(2), (4) Date: May 17, 2006

(87) PCT Pub. No.: WO2005/036218

PCT Pub. Date: Apr. 21, 2005

(65) Prior Publication Data

US 2006/0279841 A1    Dec. 14, 2006

(30) Foreign Application Priority Data

Oct. 7, 2003  (JP)  ............................ 2003-348518

(51) Int. Cl.
*G02B 5/18* (2006.01)
(52) U.S. Cl. ................ 359/572; 359/486; 359/576; 369/112.03
(58) Field of Classification Search ........... 359/486, 359/558, 566, 569, 572, 576; 369/112.01, 369/112.03, 112.06
See application file for complete search history.

(56) References Cited

U.S. PATENT DOCUMENTS 6,426,837 B1 *   7/2002   Clark et al. ............... 359/485

(Continued)

FOREIGN PATENT DOCUMENTS

EP    1 347 315 A1    9/2003

(Continued)

OTHER PUBLICATIONS

Tyan et al, "Design, Fabrication, and characterization of form-birefringent multilayer polarizing beam splitter," Optical Society of America, vol. 14, No. 7, Jul. 1997, Opt. Soc. Am. A, pp. 1627-1636.

(Continued)

*Primary Examiner*—Joshua L Pritchett
(74) *Attorney, Agent, or Firm*—Squire, Sanders & Dempsey, LLP

(57) ABSTRACT

A polarizing element usable for two wavelengths in a predetermined wavelength region and having a simple structure. The polarizing element has a two-layer structure in which a grid pattern of a constant period Λ having a triangular cross-section is formed on a substrate and a film with a refractive index higher than that of the substrate is deposited on the grid pattern. When first and second wavelengths $\lambda_1$, $\lambda_2$ satisfy $\lambda_1 < \lambda_2$, $\Lambda \cos \theta_0 < \lambda_1$ where $\theta_0$ is the angle of incidence on the grid surface. The grid period, the grid height, and the film thickness are determined so that with respect to the first wavelength $\lambda_1$, the reflection efficiency of the TE-polarized zero-order diffracted light is a predetermined value or more and the transmission efficiency of the TM-polarized zero-order diffracted light is a predetermined value or more and so that with respect to the wavelength $\lambda_2$, the transmission efficiency of the TE-polarized zero-order diffracted light is a predetermined value or more and the reflection efficiency of the TM-polarized zero-order diffracted light is a predetermined value or more.

9 Claims, 11 Drawing Sheets

U.S. PATENT DOCUMENTS

2001/0050892 A1* 12/2001 Takahashi et al. ........ 369/112.1
2003/0017580 A1 1/2003 Cunningham et al.
2003/0228413 A1* 12/2003 Ohta et al. ................. 427/162

FOREIGN PATENT DOCUMENTS

| | | |
|---|---|---|
| JP | 2001-051122 | 2/2001 |
| JP | 2002-090534 | 3/2002 |
| JP | 2002-182003 | 6/2002 |
| JP | 2002-258034 | 9/2002 |
| JP | 2002-540446 | 11/2002 |
| JP | 2004-252130 | 9/2004 |
| WO | WO 00/57215 | 9/2000 |

OTHER PUBLICATIONS

Jari Turunen, "Form-birefringence limits of Fourier-expansion methods in grating theory," vol. 13, No. 5, May 1996, J. Opt. Soc. am. A, pp. 1013-1018.

Grann et al, "Comparison between continious and discrete subwavelength grating structures for antireflection surfaces," vol. 13, No. 5, May 1996, J. Opt. Soc. Am. A, pp. 988-992.

Santos et al, "Antireflection structures with use of multilevel subwavelength zero-order gratings," vol. 36, No. 34, Dec 1, 1997, Applied Optics, pp. 8935-8938.

Rong-Chung Tyan, et al., "Polarizing Beam Splitter Based on the Anisotropic Spectral Reflectivity Characteristic of Form-Birefringent Multilayer Gratings," Optics Letters, vol. 21, No. 10, May 15, 1996, pp. 761-763.

European Search Report, Application No.//Patent No. 04773720.0-2217 // PCT/JP2004/014991, Date Mailed: May 28, 2008, pp. 1-3.

* cited by examiner

POLARIZING ELEMENT AND OPTICAL SYSTEM INCLUDING POLARIZING ELEMENT

TECHNICAL FIELD

The present invention relates to a polarizing element, in particular, a polarizing element which can be used for two wavelengths, and an optical system including the polarizing element. More particularly the invention relates to a polarization beam splitter which can be used for both the wavelength for a digital versatile disc (DVD) and the wavelength for a compact disc (CD) in an optical pickup system, and the optical system including the polarization beam splitter.

BACKGROUND ART

In the conventional grating element technology, beam splitting is performed for one wavelength of a semiconductor laser by polarizing control. For example, Japanese Patent Application Laid-Open (JP-A) No. 2002-90534 (paragraph No. 17, FIG. 1, and the like) can be referred to. That is, in two modes of TE polarization and TM polarization, light is reflected in TE polarization and the light is transmitted in TM polarization. However, the conventional grating element cannot be used in two different wavelengths of semiconductor lasers.

There has also been proposed an apparatus in which Si and $SiO_2$ are alternately laminated on a $SiO_2$ substrate to form rectangular projections having a total of five layers and polarizing control is performed for an arbitrary angle of incidence and operation wavelength. For example, Tyan et al., "Design, fabrication, and characterization of form-birefringent multi-layer polarizing beam splitter", Vol. 14, No. 7, July J. Opt. Soc. Am. A (1997) can be referred to. JP-A No. 2001-51122 discloses a polarization beam splitter in which a phase is imparted to incident light to separate polarized electromagnetic radiations by a structure in which layers are laminated repeatedly with a period shorter than first Bragg condition. However, it is difficult to actually produce the apparatus disclosed in JP-A No. 2001-51122. Further, even if the apparatus is produced, a process is complicated and production cost is expensive.

A principle of polarization splitting by a diffraction grating will be described below. As shown in FIG. 1, the light progresses from a medium having a refractive index n1 to a medium having a refractive index n2. A grating having a period $\Lambda$ is formed in a boundary.

In the light, there are two kinds of polarization which are called TE polarization (s polarization) and TM polarization (p polarization). When the light is incident to the diffraction grating, polarization in the direction in which the electric field is vibrated in parallel with a groove of the grating is called TE polarization, and the polarization in the direction in which the electric field is vibrated perpendicular to the groove (in which the magnetic field is vibrated in parallel with the groove) of the grating is called TM polarization.

When the diffraction grating satisfies the following condition of formula (1) for a wavelength $\lambda$, the light is observed in the diffraction grating structure, as if the light were traveling in a thin-film structure expressed by an effective refractive index $n_{eff}$:

$$\Lambda \cos \theta_0 < \lambda \quad (1)$$

where $\theta_0$ is an angle of incidence and $\Lambda$ is a period. In this case, the effective refractive index $n_{eff}$ varies depending on a polarization direction of the incident light, and the effective refractive index $n_{eff}$ is expressed by the following formulas in first approximation.

TE polarization: $n_{TE} = \sqrt{(1-f)n_1^2 + fn_2^2}$ (2)

$$n_{TM} = \frac{n_1 n_2}{\sqrt{fn_1^2 + (1-f)n_2^2}} \quad (3)$$

where f is a ratio of a projection side part to the period $\Lambda$ in FIG. 1. As can be seen from the above formulas, other than f of 0 and 1, the effective refractive index has different values for each of the polarization.

In a physical meaning of a difference in effective refractive index based on a state of polarization, when the light passes through a structure extremely smaller than the wavelength of the light, the structure is perceived as a shielding substance which generates scattering and the like. As a result, it can be thought that energy loss is generated when the light passes through the shielding substance, and an influence of the energy loss emerges in the form of the effective refractive index.

When any one of effective refractive indexes $n_{eff} = n_{TE}$ and $n_{eff} = n_{TM}$ (however, $n_{TE} \neq n_{TM}$) for polarization components satisfies the following formula (4) under this condition, the incident light having the polarization direction cannot pass through the thin-film layer having the effective refractive index $n_{eff}$:

$$n_1 \sin \theta_0 \geq n_{eff} \quad (4)$$

wherein the formula (4) is deformed from a relational formula (Snell's formula) of refraction of light which progresses in different mediums. In this state, an angle of refraction $\theta_1$ substantially reaches 90° in the thin-film layer having the effective refractive index $n_{eff}$ in FIG. 1, and the light cannot move to the layer having the refractive index n2. As a result, reflected light is generated as divergence of the incident energy.

Thus, when the formula (4) holds by the effect of the effective refractive index $n_{eff}$ which is observed for the light having any one of the polarization directions in the grating structure, a polarizing element having the fine period is realized.

As described above, when the period is set to the wavelength or less in the grating portion, diffracted waves are not generated in the progress of the light expressed as an electromagnetic wave. Accordingly, diffraction effect expressed by superposition of waves is not observed. The grating portion is regarded as an object in which a refractive index varies for the progress of the wave, and the grating portion imparts such an effect to the electromagnetic wave as if it were traveling in a material having a virtual refractive index. As a result, the same effect as the thin-film layer is brought in a particular wavelength range. A technique of assuming that the grating portion is a material having a virtual refractive index is called effective refractive index method. For example, a formula for determining an effective refractive index from a grating shape is described in *Journal of Optical Society of America A* Vol. 13, No. 5, p 1013. In the layer with an effective refractive index, a value of the effective refractive index is determined by a ratio of the projection part to the period of the grating portion. The grating portion having rectangular pits and projections also depends on a particular wavelength band, and design of the gratin portion is determined by the ratio and a height of the rectangular pits and projections. For example, as disclosed in Journal of Optical Society of America A Vol. 13, No. 5, p 988, or Applied Optics Vol. 36, No. 34, p 8935, in order to widen a wavelength band, an effective refractive index can continuously be changed by forming the grating portion in triangular shape with respect to a height direction. The same performance as the effect of laminating many thin-film layers by which the change is continuously imparted, can be obtained by the operation.

However, the polarizing element having a simple structure which can be used for two wavelengths in a predetermined wavelength range has not been developed yet.

DISCLOSURE OF THE INVENTION

Thus, there are large needs for the polarizing element having a simple structure which can be used in two wavelengths of a predetermined wavelength range.

In a polarizing element according to the invention, the polarizing element has a two-layer structure in which a grating pattern having a constant period $\Lambda$ is formed in a substrate, a cross section of the grating pattern having a rectangular shape, and a film having a refractive index higher than that of the substrate is deposited on the grating pattern. $\Lambda \cos \theta_0 < \lambda$ where $\lambda$ is a wavelength and $\theta_0$ is an angle of incidence to a grating surface, and the grating period, a grating height, and a film thickness are determined such that reflection efficiency of zero-order diffracted light of TE polarization is not lower than a predetermined value (0.8) while transmission efficiency of zero-order diffracted light of TM polarization is not lower than the predetermined value (0.8).

In a polarizing element according to the invention, the polarizing element has a two-layer structure in which a grating pattern having a constant period $\Lambda$ is formed in a substrate, a cross section of the grating pattern having a triangular shape, and a film having a refractive index higher than that of the substrate is deposited on the grating pattern. $\Lambda \cos \theta_0 < \lambda$ where $\lambda$ is a wavelength and $\theta_0$ is an angle of incidence to a grating surface, and the grating period, a grating height, and a film thickness are determined such that reflection efficiency of zero-order diffracted light of one of TE polarization and TM polarization is not lower than a predetermined value (0.7) while transmission efficiency of zero-order diffracted light of the other of TE polarization and TM polarization is not lower than the predetermined value (0.7).

In a polarizing element according to the invention, the polarizing element has a two-layer structure in which a grating pattern having a constant period $\Lambda$ is formed in a substrate, a cross section of the grating pattern having a rectangular shape, and a film having a refractive index higher than that of the substrate is deposited on the grating pattern. In the case where a first wavelength $\lambda_1$ and a second wavelength $\lambda_2$ satisfy a relationship of $\lambda_1 < \lambda_2$, $\Lambda \cos \theta_0 < \lambda_1$ where $\theta_0$ is an angle of incidence to a grating surface. The grating period, a grating height, and a film thickness are determined such that reflection efficiency of zero-order diffracted light of TE polarization is not lower than a predetermined value (0.7) for the first wavelength $\lambda_1$ while transmission efficiency of zero-order diffracted light of TM polarization is not lower than the predetermined value (0.7) for the first wavelength $\lambda_1$, and such that transmission efficiency of the zero-order diffracted light of TE polarization is not lower than the predetermined value (0.7) for the second wavelength $\lambda_2$ while reflection efficiency of zero-order diffracted light of TM polarization is not lower than the predetermined value (0.7) for the second wavelength $\lambda_2$.

Alternatively, the grating period, the grating height, and the film thickness are determined such that reflection efficiency of zero-order diffracted light of TE polarization is not lower than a predetermined value (0.7) for the first wavelength $\lambda_1$ while transmission efficiency of zero-order diffracted light of TM polarization is not lower than the predetermined value (0.7) for the first wavelength $\lambda_1$, and such that reflection efficiency of zero-order diffracted light of TE polarization is not lower than the predetermined value (0.7) for the second wavelength $\lambda_2$ while transmission efficiency of zero-order diffracted light of TM polarization is not lower than the predetermined value (0.7) for the second wavelength $\lambda_2$.

Accordingly, the polarizing element according to the invention can be approximated to many layers with effective refractive indexes, formed by the grating of the substrate and many layers with effective refractive indexes, formed by the grating of the film, and the polarizing element of the invention can have the polarization characteristics for the first and second wavelengths. Since the polarizing element of the invention has the simple structure in which one-layer film is deposited on the substrate, the production method is simple and the production cost is inexpensive. Further, the polarizing element of the invention has a compact structure, and miniaturization of the apparatus can be realized.

In a polarizing element according to an embodiment of the invention, the substrate is made of a synthetic resin.

In a polarizing element according to an embodiment of the invention, the substrate is made of a transparent resin such as acryl and polyolefin.

Accordingly, a polarizing element according to an embodiment of the invention is inexpensive.

In a polarizing element according to an embodiment of the invention, the grating pattern of the substrate is formed by transfer from a metal mold.

Accordingly, in a polarizing element according to an embodiment of the invention, a production method is simple, and production cost is also inexpensive.

In a polarizing element according to an embodiment of the invention, the film is a deposited film.

Accordingly, because one layer is deposited on the substrate, the production method is simple.

In a polarizing element according to an embodiment of the invention, the deposited film is made of a material such as $TiO_2$ having a refractive index higher than a refractive index of the substrate. When the deposited film is made of $TiO_2$, the deposited film has a high adhesion property to the resin.

In a polarizing element according to an embodiment of the invention, a thickness of the deposited film is smaller than 0.3 micrometers.

In a polarizing element according to an embodiment of the invention, the grating height is smaller than the grating period.

In a polarizing element according to an embodiment of the invention, the first wavelength is the wavelength for a digital versatile disc, and the second wavelength is the wavelength for a compact disc.

Accordingly, the polarizing element according to the embodiment of the invention can be used in optical pickup systems for both digital versatile discs and compact discs.

An optical system of the invention includes a first-wavelength light source, a second-wavelength light source, and a polarizing element. The polarizing element is configured to reflect light from the light source of any wavelength in order to cause the light to reach to a disc and to transmit the return light reflected by the disc.

An optical system of the invention includes a first-wavelength light source, a second-wavelength light source, and a polarizing element. The polarizing element is configured to reflect light from the first-wavelength light source and the second-wavelength light source in order to cause the light to reach to a disc and to transmit the return light reflected by the disc.

Accordingly, the optical system of the invention can be used in optical pickup systems for both digital versatile discs and compact discs.

BEST MODE FOR CARRYING OUT THE INVENTION

Figure 1:
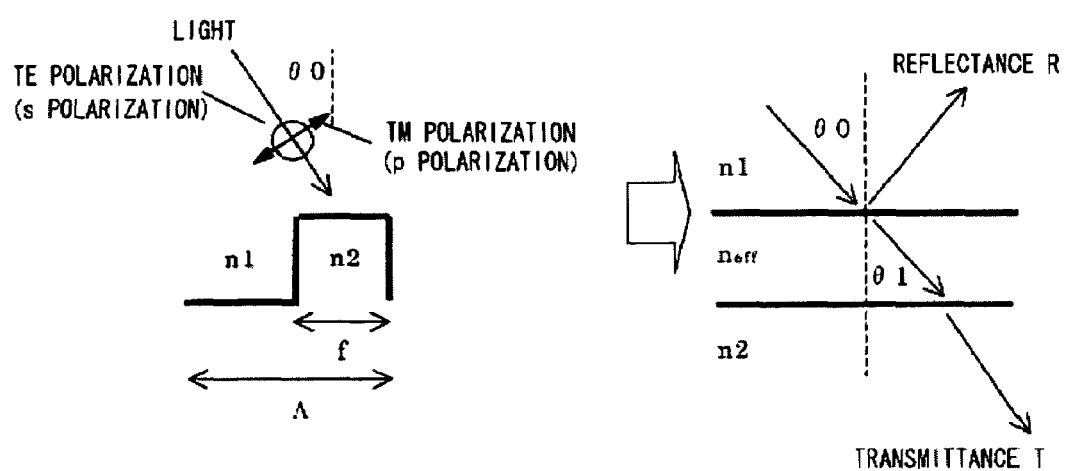
FIG. 1 explains the principle of polarization splitting by a diffraction grating.
Figure 2:
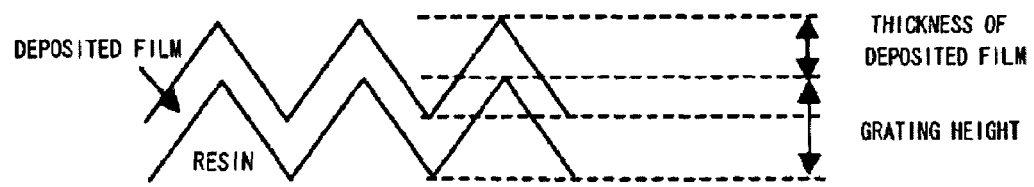
FIG. 2 shows a structure of a two-layer triangular grating of the invention.

A two-wavelength polarization beam splitter according to an embodiment of the invention has a two-layer structure in which a grating pattern having a constant period A is formed in a substrate, a cross section of the grating pattern having a rectangular shape, and a film having a refractive index higher than that of the substrate is deposited on the grating pattern. FIG. 2 shows the two-layer structure. The substrate is made of a resin, and the substrate is preferably made of acryl or polyolefin. The grating pattern on the substrate is produced by transfer of a fine shape formed in a resin-molding metal mold. The fine shape formed in the resin-molding metal mold is produced with a laser beam machining apparatus. A film such as a $TiO_2$ film having a refractive index higher than that of the resin is formed as a high refractive index layer on the grating pattern, transferred in the above-mentioned manner on the resin substrate, by deposition or the like. In the case of deposition, a film thickness is smaller than 0.3 µm due to restrictions from the production. In the case where a relationship of $\lambda_1<\lambda_2$ is satisfied for a first wavelength $\lambda_1$ and second wavelength $\lambda_2$, a grating period $\Lambda$ and an angle of incidence $\theta_0$ to a grating surface are set so as to satisfy a relationship of $\Lambda \cos \theta_0<\lambda_1$. A grating height is set so as to be smaller than the grating period.

In the following description, it is assumed that the first wavelength is the DVD wavelength (0.66 µm) and the second wavelength is the CD wavelength (0.785 µm).

Figure 3:
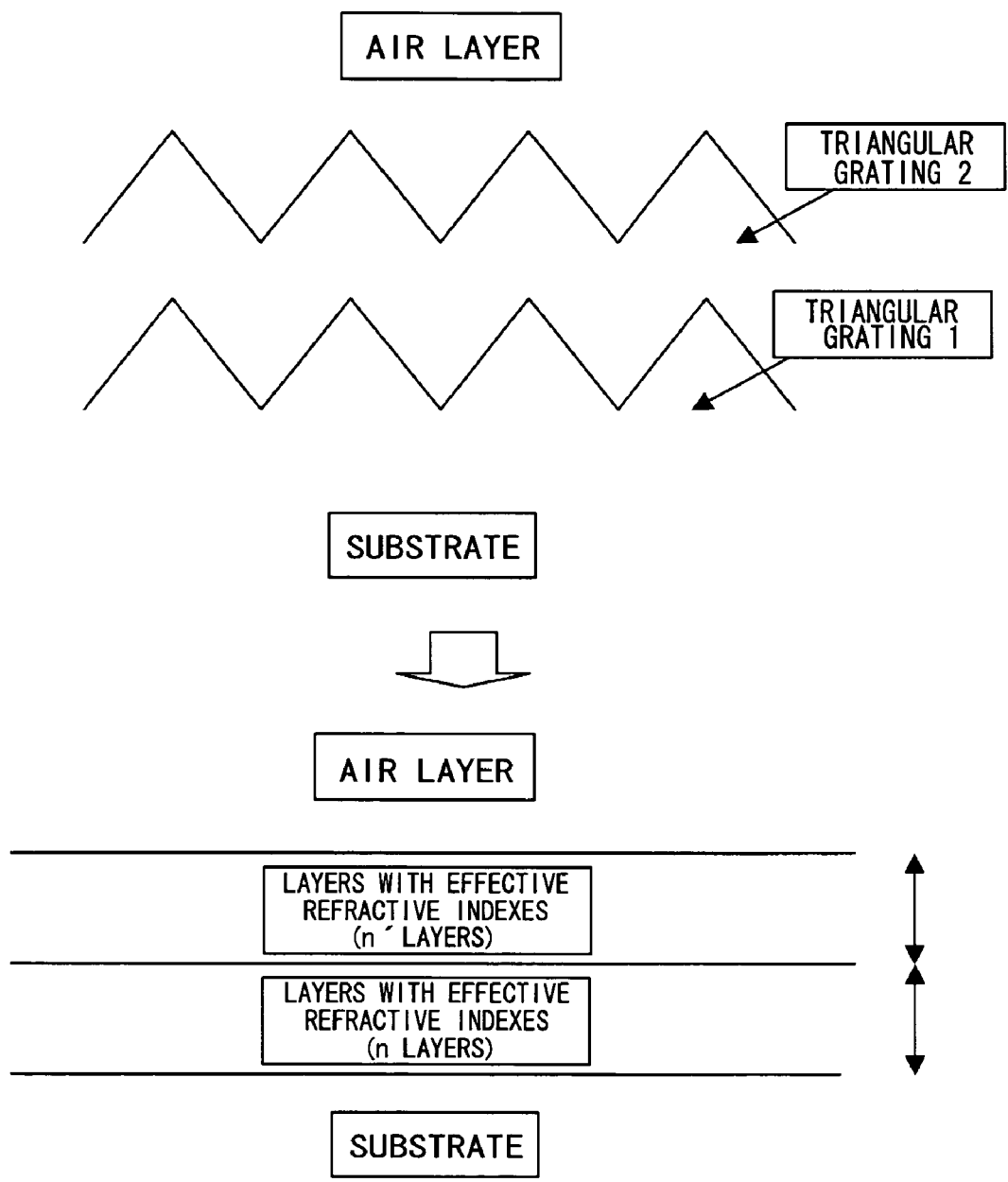
FIG. 3 shows a two-layer triangular grating of the invention.
Figure 4:
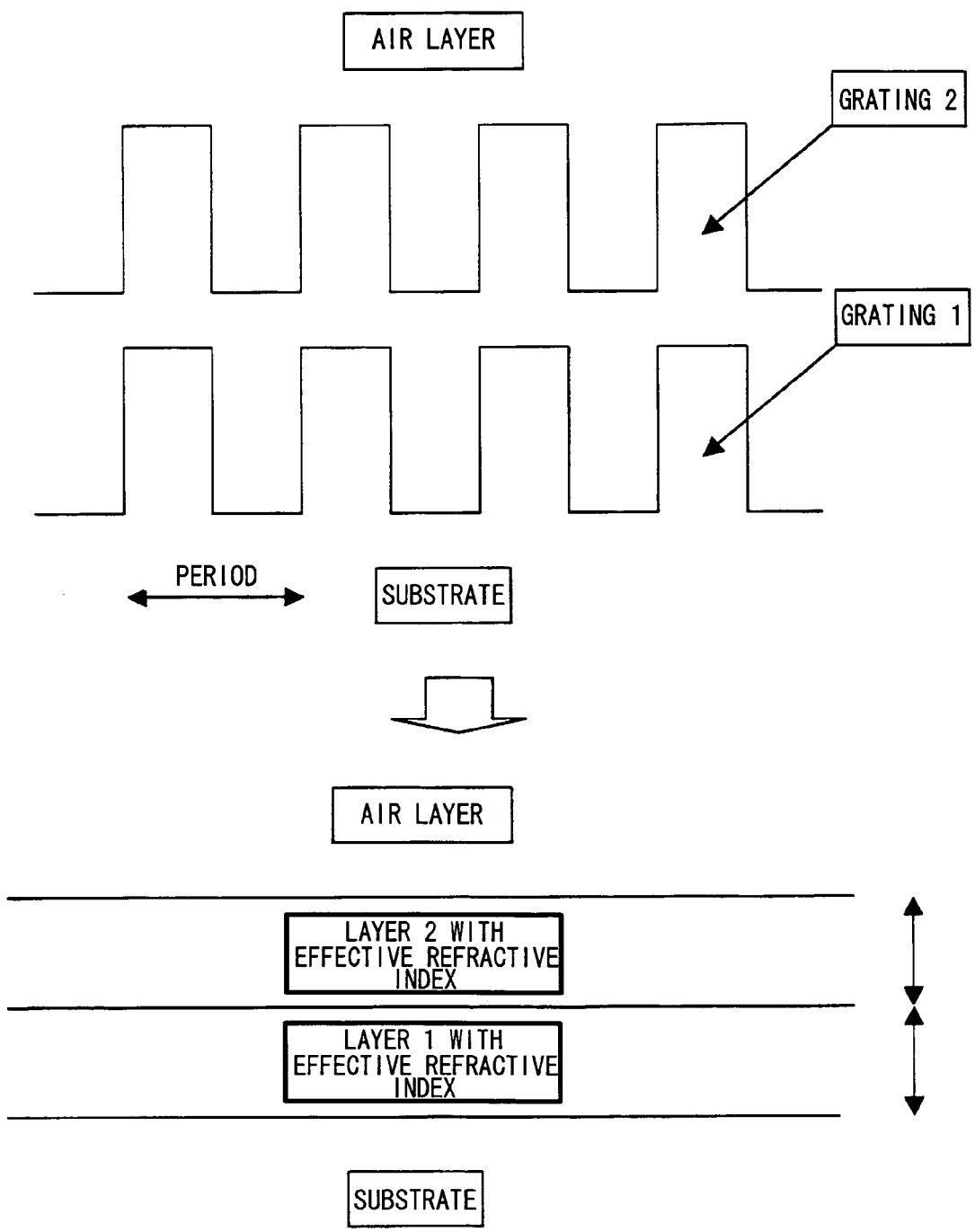
FIG. 4 shows a two-layer rectangular grating.

The two-layer triangular grating (FIG. 3) of the invention will be described in comparison to the two-layer rectangular grating (FIG. 4). The two-layer rectangular grating can be approximated to the two layers with effective refractive indexes, including layer 1 with an effective refractive index, formed by the grating of the substrate and layer 2 with another effective refractive index, formed by the grating of the film. The two-layer triangular grating of the invention can be approximated to an n layers with effective refractive indexes, formed by the grating of the substrate and n' layers with effective refractive indexes, formed by the grating of the film. The structure enables the two-layer triangular grating of the invention to have polarization property with respect to the two wavelengths.

Specifically, dependency of TE polarization and TM polarization on wavelength is adjusted by adjusting the grating period. The adjustment is performed such that reflection efficiency or transmission efficiency of the DVD wavelength becomes a peak in one of TE polarization and TM polarization while reflection efficiency or transmission efficiency of the CD wavelength becomes a peak in one of TE polarization and TM polarization. Peak efficiency is adjusted by adjusting the resin height and the film thickness.

In each wavelength, the adjustment may be performed such that one of the polarization modes is transmitted (the transmission efficiency is not lower than a constant value) while the other of the polarization modes is reflected (the reflection efficiency is not lower than the constant value).

Numerical examples will be described below.

Numerical Example 1

Table 1 shows specifications of a two-layer triangular grating of Numerical Example 1.

TABLE 1

| Sectional shape: triangle | |
| --- | --- |
| Pitch | 0.8 µm |
| Resin height | 0.2690476 µm |
| Thickness of deposited film | 0.2959524 µm |
| Resin + film | 0.565 µm |

In this case, the resin height shall mean the grating height of the resin portion.

Figure 5:
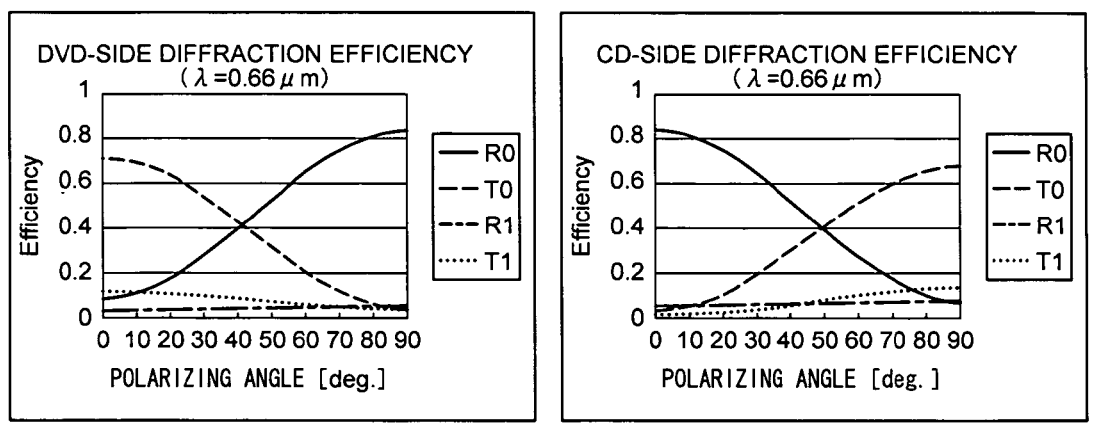
FIG. 5 shows diffraction efficiencies of a two-layer triangular grating (Numerical Example 1) of the invention.
Figure 6:
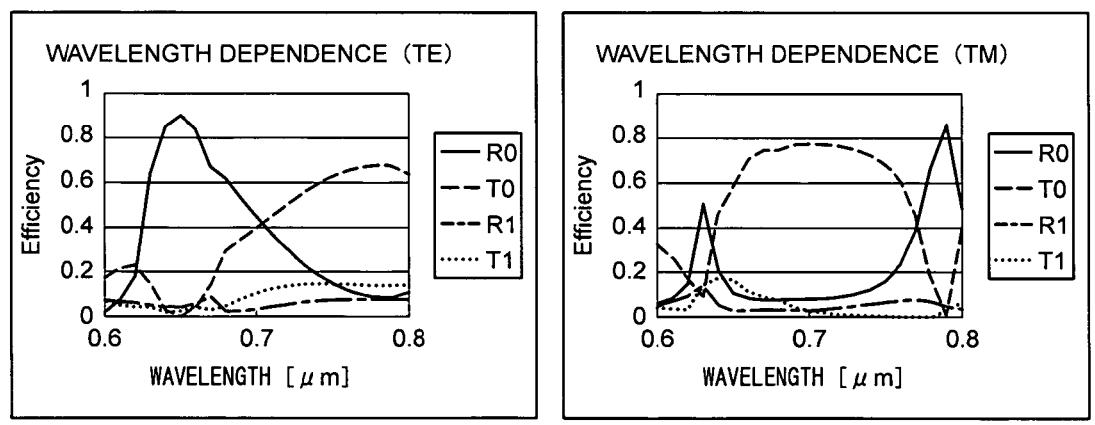
FIG. 6 shows dependency of the two-layer triangular grating (Numerical Example 1) of the invention on wavelength.
Figure 7:
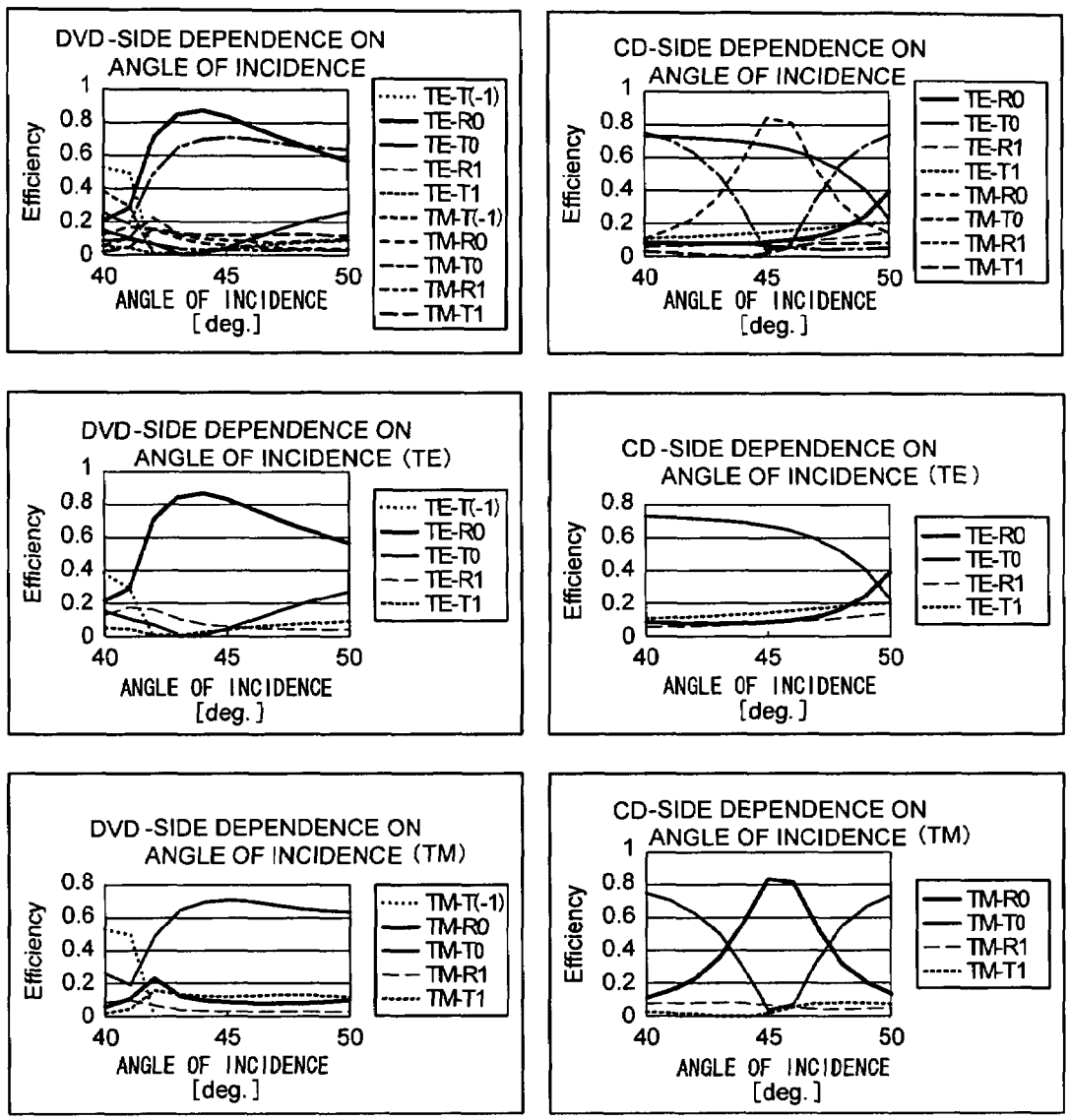
FIG. 7 shows dependency of the two-layer triangular grating (Numerical Example 1) of the invention on angle of incidence.

FIG. 5 shows diffraction efficiencies (transmission efficiency and reflection efficiency) for polarizing angles of the DVD wavelength and CD wavelength. In polarizing angle, TM polarization is zero degree and TE polarization is 90 degrees. An angle of incidence to the grating surface is 45 degrees. FIG. 6 shows wavelength dependency of TE mode and TM mode. FIG. 6 shows states in which wavelength is changed from the state of TE polarization and TM polarization of FIG. 5. FIG. 7 shows dependency of the DVD wavelength and CD wavelength on angle of incidence. FIG. 7 shows states in which angle of incidence is changed from the state of TE polarization and TM polarization of FIG. 5.

As can be seen from FIG. 5, reflection is not lower than 80% in TE polarization of the DVD wavelength, and transmission is not lower than 70% in TM polarization of the DVD wavelength. Transmission is not lower than 70% in TE polarization of the CD wavelength, and reflection is not lower than 80% in TM polarization of the CD wavelength. Thus, the two-wavelength polarization beam splitter of Numerical Example 1 has the polarization characteristics with respect to the DVD wavelength and the CD wavelength.

Numerical Example 2

Table 2 shows specifications of a two-layer triangular grating of Numerical Example 2.

TABLE 2

| Sectional shape: triangle | |
| --- | --- |
| Pitch | 0.82 μm |
| Resin height | 0.32 μm |
| Thickness of deposited film | 0.24 μm |
| Resin + film | 0.56 μm |

In this case, the resin height shall mean the grating height of the resin portion.

Figure 8:
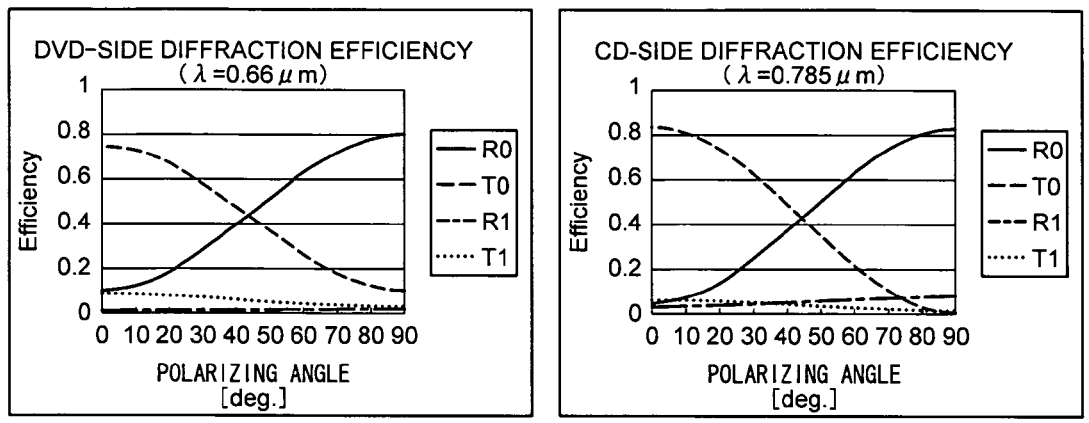
FIG. 8 shows diffraction efficiencies of a two-layer triangular grating (Numerical Example 2) of the invention.
Figure 9:
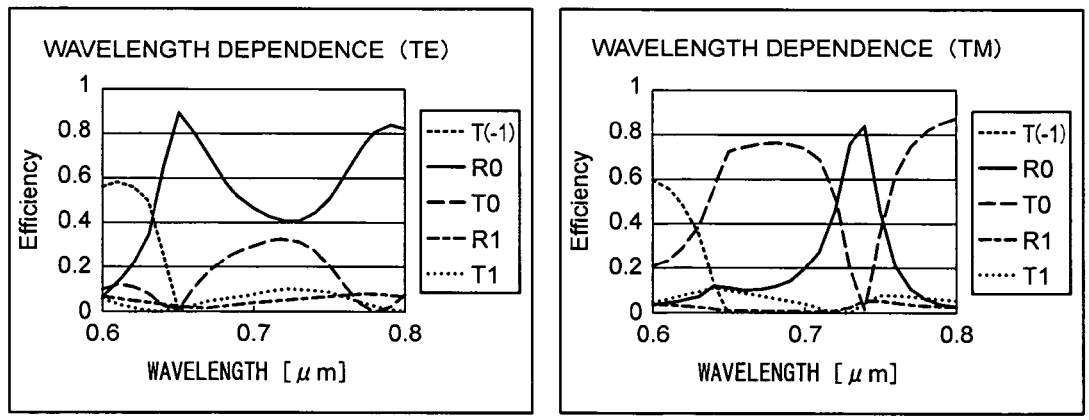
FIG. 9 shows dependency of the two-layer triangular grating (Numerical Example 2) of the invention on wavelength.
Figure 10:
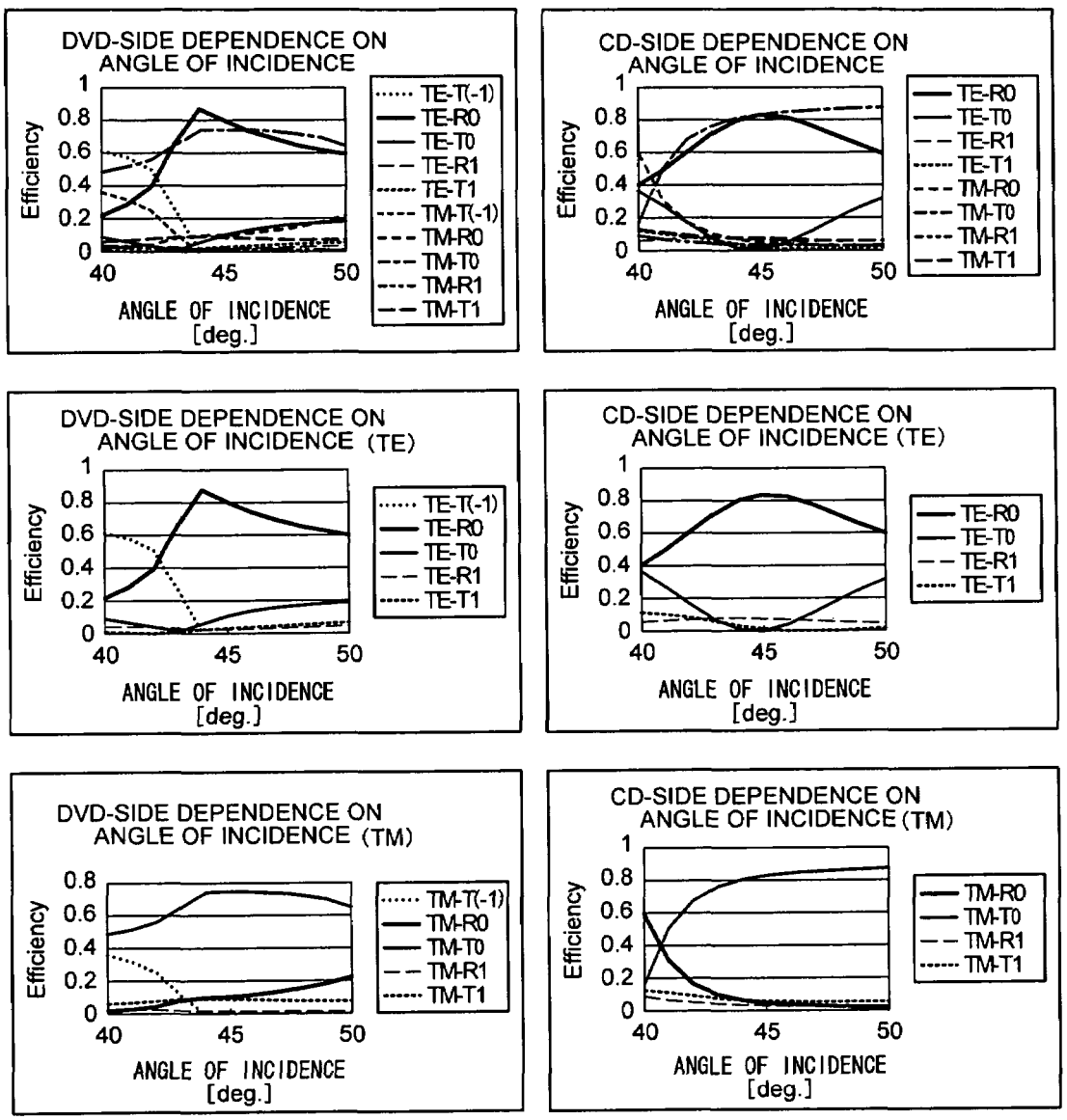
FIG. 10 shows dependency of the two-layer triangular grating (Numerical Example 2) of the invention on angle of incidence.

FIG. 8 shows diffraction efficiencies (transmission efficiency and reflection efficiency) for polarizing angles of the DVD wavelength and CD wavelength. In polarizing angle, TM polarization is zero degree and TE polarization is 90 degrees. An angle of incidence to the grating surface is 45 degrees. FIG. 9 shows wavelength dependency of TE mode and TM mode. FIG. 9 shows states in which wavelength is changed from the state of TE polarization and TM polarization of FIG. 8. FIG. 10 shows dependency of the DVD wavelength and CD wavelength on angle of incidence. FIG. 10 shows states in which angle of incidence is changed from the state of TE polarization and TM polarization of FIG. 8.

As can be seen from FIG. 8, reflection is not lower than 80% in TE polarization of the DVD wavelength, and transmission is not lower than 70% in TM polarization of the DVD wavelength. Reflection is not lower than 80% in TE polarization of the CD wavelength, and transmission is not lower than 80% in TM polarization of the CD wavelength. Thus, the two-layer triangular grating of Numerical Example 2 has polarization characteristics with respect to the DVD wavelength and the CD wavelength.

Numerical Example 3

Figure 11:
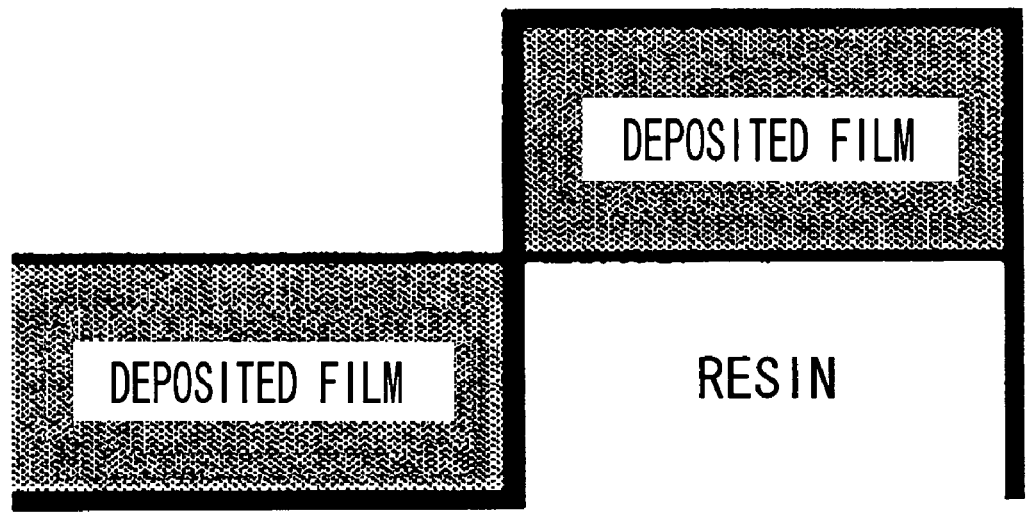
FIG. 11 shows a structure of two-layer rectangular grating.

Then, a two-layer rectangular grating which is of Numerical Example 3 will be described. FIG. 11 shows a structure of the two-layer rectangular grating.

Table 3 shows specifications of the two-layer rectangular grating of Numerical Example 3.

TABLE 3

| Sectional shape: rectangle | |
| --- | --- |
| Pitch | 0.75 μm |
| Resin height | 0.1 μm |
| Thickness of deposited film | 0.1 μm |
| Resin + film | 0.2 μm |

In this case, the resin height shall mean the grating height of the resin portion.

Figure 12:
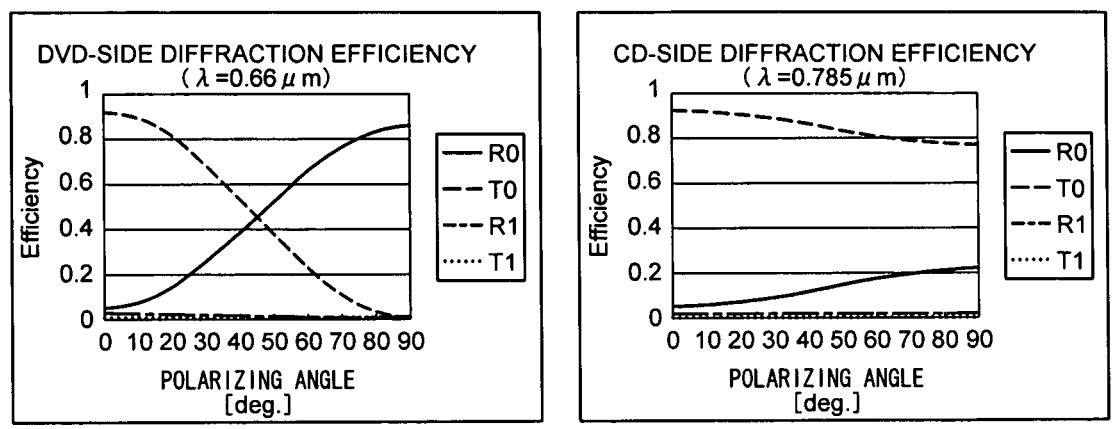
FIG. 12 shows diffraction efficiencies of the two-layer rectangular grating.
Figure 13:
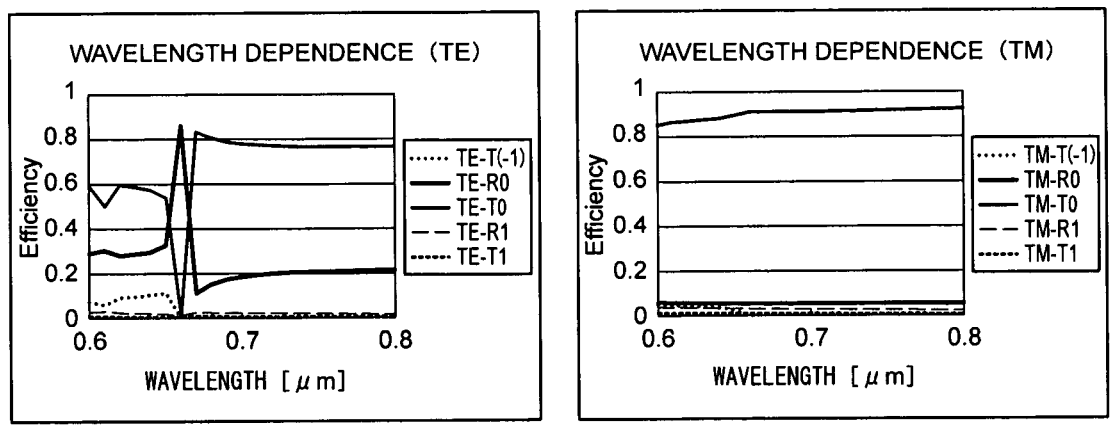
FIG. 13 shows dependency of the two-layer rectangular grating on wavelength.
Figure 14:
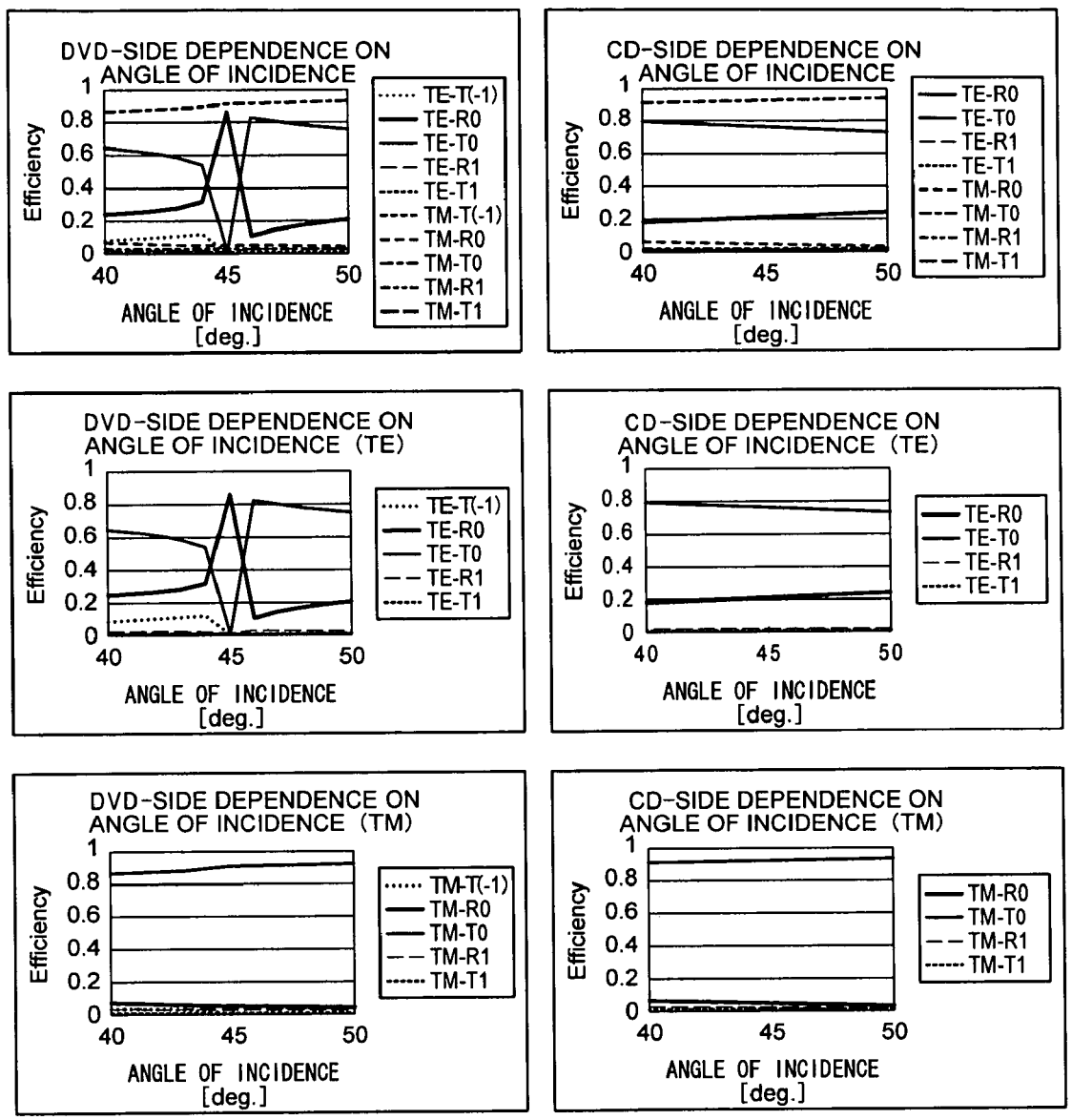
FIG. 14 shows dependency of the two-layer rectangular grating on angle of incidence.

FIG. 12 shows diffraction efficiencies (transmission efficiency and reflection efficiency) for polarizing angles of the DVD wavelength and CD wavelength. An angle of incidence to the grating surface is 45 degrees. In polarizing angle, TM polarization is zero degree and TE polarization is 90 degrees. FIG. 13 shows wavelength dependency of TE mode and TM mode. FIG. 13 shows states in which wavelength is changed from the state of TE polarization and TM polarization of FIG. 12. FIG. 14 shows dependency of the DVD wavelength and CD wavelength on angle of incidence. FIG. 14 shows states in which angle of incidence is changed from the state of the TE polarization and TM polarization of FIG. 12.

As can be seen from FIG. 12, reflection is not lower than 80% in TE polarization of the DVD wavelength, and transmission is not lower than 80% in TM polarization of the DVD wavelength. However, as can be seen from FIG. 12, the two-layer rectangular grating of Numerical Example 3 does not have the polarization characteristics with respect to the CD wavelength.

Optical Pickup Optical System

A configuration of an optical pickup system in which the polarization beam splitter of the invention is used will be described below with reference to FIGS. 15 and 16.

Figure 15:
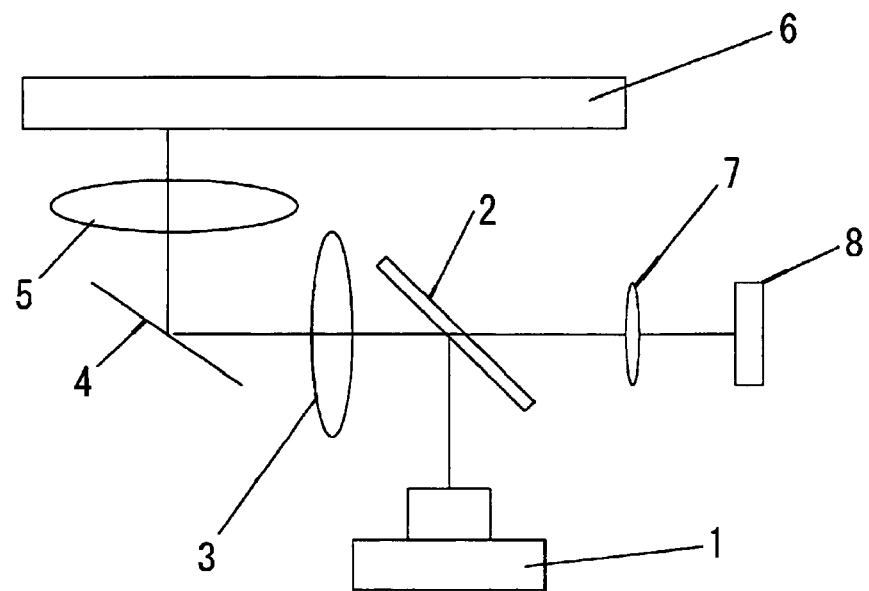
FIG. 15 shows a configuration of an optical pickup system in which a polarization beam splitter of Numerical Examples 1 or 2 of the invention is used.

Referring to FIG. 15, a light beam emitted from a two-wavelength laser light source 1 is reflected by a polarization beam splitter 2 to reach a disc (DVD or CD) 6 through a collimator lens 3, a fixed mirror 4, and an objective lens 5. A quarter-wave plate (not shown) is provided between the polarization beam splitter 2 and the collimator lens 3. The light beam reflected from the disc 6 is returned to the polarization beam splitter 2 through the objective lens 5, the fixed mirror 4, the collimator lens 3, and the quarter-wave plate. Since the light beam has passed through the quarter-wave plate twice until the light beam is returned to the polarization beam splitter 2, the phase is changed by 90 degrees. The light beam passes through the polarization beam splitter 2 and a collective lens 7, and the light beam is detected by a photodiode 8.

The case where the two-layer triangular grating of Numerical Example 1 is used as the polarization beam splitter 2 will be described below. The light having the DVD wavelength is incident in TE polarization state to the polarization beam splitter 2 from the two-wavelength laser light source 1. Accordingly, the light is reflected by the polarization beam splitter 2 (left side of FIG. 5). The returned light is in TM polarization state, so that the light is transmitted through the polarization beam splitter 2 (left side of FIG. 5). On the other hand, the light having the CD wavelength is incident in TM polarization state to the polarization beam splitter 2 from the laser light source 1. Accordingly, the polarization beam splitter 2 reflects the light (right side of FIG. 5). The returned light beam is in TE polarization state, so that the light beam is transmitted through the polarization beam splitter 2 (right side of FIG. 5).

The case where the two-layer triangular grating of Numerical Example 2 is used as the polarization beam splitter 2 will be described below. The light having the DVD wavelength is incident in TE polarization state to the polarization beam splitter 2 from the two-wavelength laser light source 1. Accordingly, the light is reflected by the polarization beam splitter 2 (left side of FIG. 8). The returned light is in TM polarization state, so that the light is transmitted through the polarization beam splitter 2 (left side of FIG. 8). On the other hand, the light having the CD wavelength is incident in the TE polarization state to the polarization beam splitter 2 from the laser light source 1. Accordingly, the light is reflected by the polarization beam splitter 2 (right side of FIG. 8). The returned light is in TM polarization state, so that the light is transmitted through the polarization beam splitter 2 (right side of FIG. 8).

Figure 16:
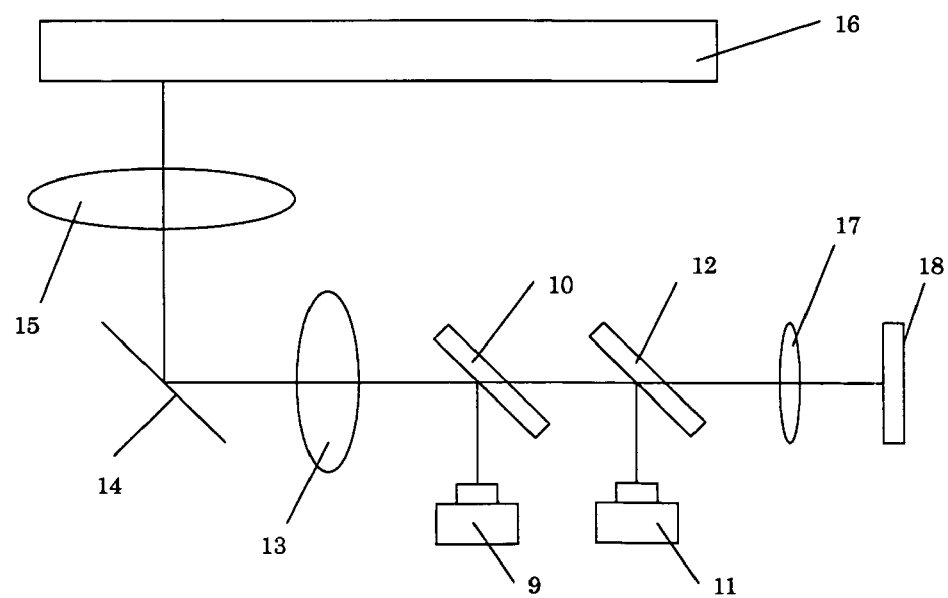
FIG. 16 shows a configuration of an optical pickup system in which a polarization beam splitter of Numerical Example 3 of the invention is used.

Referring to FIG. 16, the light beam emitted from a DVD-wavelength laser light source 9 is reflected by a polarization beam splitter 10 to reach a disc (DVD or CD) 16 through a collimator lens 13, a fixed mirror 14, and an objective lens 15. A quarter-wave plate (not shown) is provided between the polarization beam splitter 10 and the collimator lens 13. The light beam reflected from the disc 16 is returned to the polarization beam splitter 10 through the objective lens 15, the fixed mirror 14, the collimator lens 13, and the quarter-wave plate. Since the light beam has passed through the quarter-wave plate twice until the light beam is returned to the polarization beam splitter 10, the phase is changed by 90 degrees. The light beam passes through the polarization beam splitter 10, a polarization beam splitter 12, and a collective lens 17, and then the light beam is detected by a photodiode 18.

On the other hand, a light beam emitted from a CD-wavelength laser 11 is reflected by the polarization beam splitter 12 and transmitted through the polarization beam splitter 10, and the light beam reaches the disc (DVD or CD) 16 through the collimator lens 13, the fixed mirror 14, and the objective lens 15. The quarter-wave plate (not shown) is provided between the polarization beam splitter 10 and the collimator lens 13. The light beam reflected from the disc 16 is returned to the polarization beam splitter 10 through the objective lens 15, the fixed mirror 14, the collimator lens 13, and the quarter-wave plate. Since the light beam has passed through the quarter-wave plate twice until the light beam is returned to the polarization beam splitter 10, the phase is changed by 90 degrees. The light beam passes through the polarization beam splitter 10, the polarization beam splitter 12, and the collective lens 17, and then the light beam is detected by the photodiode 18.

The case where the two-layer rectangular grating of Numerical Example 3 is used as the polarization beam splitter 10 will be described below. The light having the DVD wavelength is incident in TE polarization state to the polarization beam splitter 10 from the DVD-wavelength laser light source 9. Accordingly, the light is reflected by the polarization beam splitter 10 (left side of FIG. 12). The returned light is in TM polarization state, so that the light is transmitted through the polarization beam splitter 2 (left side of FIG. 12). On the other hand, the light having the CD wavelength is incident in TM polarization state to the polarization beam splitter 12 from the laser light source 11. Accordingly, the light is reflected by the polarization beam splitter 12, and the light is incident to the polarization beam splitter 10 and transmitted through the polarization beam splitter 10 (right side of FIG. 12). Since the returned light is in the TE polarization state, the light is transmitted through the polarization beam splitter 10 (right side of FIG. 12), and the light is incident to the polarization beam splitter 12 and transmitted through the polarization beam splitter 12.

The invention claimed is:

1. A polarizing element, wherein the polarizing element has a two-layer structure in which a grating pattern having a constant period $\Lambda$ is formed in a substrate, a cross section of the grating pattern having a triangular shape, and a film having a refractive index higher than that of the substrate is deposited on the grating pattern, in the case where a first wavelength $\lambda_1$ and a second wavelength $\lambda_2$ satisfy a relationship of $\lambda_1 < \lambda_2$, $\Lambda \cos \theta_0 < \lambda_1$ where $\theta_0$ is an angle of incidence to a grating surface, and the grating period, a grating height, and a film thickness are determined such that reflection efficiency of zero-order diffracted light of TE polarization is not lower than a predetermined value that is sufficient for the polarizing element functions as a reflecting element for the first wavelength $\lambda_1$ while transmission efficiency of zero-order diffracted light of TM polarization is not lower than the predetermined value that is sufficient for the polarizing element functions as a transmitting element for the first wavelength $\lambda_1$, and such that transmission efficiency of the zero-order diffracted light of the TE polarization is not lower than the predetermined value that is sufficient for the polarizing element functions as a transmitting element for the second wavelength $\lambda_2$ while reflection efficiency of the zero-order diffracted light of TM polarization is not lower than the predetermined value that is sufficient for the polarizing element functions as a reflecting element for the second wavelength $\lambda_2$.

2. A polarizing element according to claim 1, wherein the predetermined value is 0.7.

3. A polarizing element according to claim 1, wherein the first wavelength is the wavelength for a digital versatile disc and the second wavelength is the wavelength for a compact disc.

4. An optical system including a first-wavelength light source, a second-wavelength light source, and a polarizing element according to claim 1, wherein the polarizing element is configured to reflect light from the first-wavelength light source and the second-wavelength light source in order to cause the light to reach to a disc and to transmit the return lights reflected by the disc.

5. A polarizing element according to claim 1, wherein the substrate is made of a synthetic resin.

6. A polarizing element according to claim 1, wherein the grating pattern of the substrate is formed by transfer from a metal mold.

7. A polarizing element according to claim 1, wherein the film is a deposited film.

8. A polarizing element according to claim 1, wherein the grating height is smaller than the grating period.

9. An optical system including a first-wavelength light source, a second-wavelength light source, and a polarizing element according to claim 1, wherein the polarizing element is configured to reflect light from the light source of any wavelength in order to cause the light to reach to a disc and to transmit the return light reflected by the disc.

* * * * *